(12) United States Patent
Tsai et al.

(10) Patent No.: US 10,547,816 B2
(45) Date of Patent: Jan. 28, 2020

(54) PROJECTION DEVICE AND ILLUMINATION SYSTEM

(71) Applicant: Coretronic Corporation, Hsin-Chu (TW)

(72) Inventors: Chih-Hsien Tsai, Hsin-Chu (TW); Yi-Hsuang Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/257,094

(22) Filed: Jan. 25, 2019

(65) Prior Publication Data

US 2019/0238803 A1 Aug. 1, 2019

(30) Foreign Application Priority Data

Jan. 26, 2018 (CN) .................... 2018 2 0135939 U (51) Int. Cl.
*H04N 9/04* (2006.01)
*G03B 21/20* (2006.01)
(Continued)

(52) U.S. Cl.
CPC ......... *H04N 9/0455* (2018.08); *G02B 27/141* (2013.01); *G03B 21/2013* (2013.01);
(Continued)

(58) Field of Classification Search
CPC .... G03B 21/28; G03B 21/204; G03B 21/208; G03B 21/2013; G03B 21/2033; G03B 21/2053; G03B 21/2066; G02B 27/0028; G02B 27/126; G02B 27/149; G02B 27/0905; G02B 27/1026; G02B 27/1046; H04N 9/0455; H04N 9/04521; H04N 9/3111; H04N 9/3114; H04N 9/315; H04N 9/3182; H04N 9/3197
See application file for complete search history.

(56) References Cited

U.S. PATENT DOCUMENTS

2012/0249974 A1* 10/2012 Ogino ................ G03B 21/2013
353/38
2015/0131062 A1* 5/2015 Nishimori .............. G03B 21/16
353/84

FOREIGN PATENT DOCUMENTS

CN 103376634 B 11/2015
TW 200304643 A 10/2003
(Continued)

*Primary Examiner* — Sultan Chowdhury (57) ABSTRACT

An illumination system includes an excitation light source group, a first dichroic device, a second dichroic device, an actuation element, and a wavelength conversion device. The excitation light source group includes a plurality of excitation light sources. Each excitation light source provides an excitation beam. The first dichroic device configures the excitation beam to pass therethrough. The second dichroic device includes a plurality of dichroic elements which are arranged at intervals and reflect the excitation beam. The actuation element configures the excitation beam to pass through the second dichroic device in a first period through intervals between the dichroic elements, and configures the excitation beam to be reflected by the dichroic element in a second period. The wavelength conversion device converts the excitation beam into a conversion beam. The invention further provides a projection device having this illumination system.

16 Claims, 10 Drawing Sheets

(51) Int. Cl.
*H04N 9/31* (2006.01)
*G02B 27/14* (2006.01)

(52) U.S. Cl.
CPC ..... *G03B 21/2066* (2013.01); *H04N 9/04521* (2018.08); *H04N 9/3111* (2013.01); *H04N 9/3114* (2013.01); *H04N 9/3158* (2013.01)

(56) References Cited

FOREIGN PATENT DOCUMENTS

| | | |
|---|---|---|
| TW | 200410054 A | 6/2004 |
| TW | 200412000 A | 7/2004 |
| TW | 201310157 A | 3/2013 |
| TW | 201640210 A | 11/2016 |

\* cited by examiner

PROJECTION DEVICE AND ILLUMINATION SYSTEM

CROSS-REFERENCE TO RELATED APPLICATION

This application claims the priority benefit of China application (CN201820135939.2 filed on Jan. 26, 2018). The entirety of the above-mentioned patent application is hereby incorporated by reference herein and made a part of this specification.

FIELD OF THE INVENTION

The invention relates to a display device, and more particularly to a projection device and an illumination system thereof.

BACKGROUND OF THE INVENTION

For a projection device, a blue laser diode is generally adopted to provide a blue light to excite a phosphor on a phosphor wheel to generate a yellow light. Then, the required red light and green light are filtered out through a filter wheel, and are then accompanied with the blue light emitted by the blue laser diode to constitute the three primary colors, red, green and blue, required for projection pictures.

In a conventional architecture adopting a blue laser diode accompanied with a phosphor wheel, a dichroic element is provided between the blue laser diode and the phosphor wheel. The blue light passes through the dichroic element and is transmitted to the phosphor wheel. The yellow light generated by the phosphor is reflected to the dichroic element and is reflected by the dichroic element to the filter wheel. In addition, it is necessary to use a plurality of reflection mirrors so that the blue light, not absorbed by the phosphor, additionally winds around a circle of light paths and passes through the dichroic element to be transmitted to the filter wheel. Therefore, a volume of the conventional architecture adopting a blue laser diode accompanied with a phosphor wheel is relatively larger, resulting in the circumstance that a volume of the projection device cannot be reduced.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a projection device, which has an advantage of smaller volume.

The invention provides an illumination system, which has an advantage of smaller volume.

Other objectives and advantages of the invention can be further understood from the technical features disclosed in the invention.

In order to achieve one or a portion or all of the objectives or other objectives, a projection device provided by an embodiment of the invention includes an illumination system, a light valve, and a projection lens. The illumination system is adapted to provide an illumination beam. The light valve is disposed on a transmission path of the illumination beam and adapted to convert the illumination beam into an image beam. The projection lens is disposed on a transmission path of the image beam and is used for allowing the image beam to pass therethrough. The illumination system includes an excitation light source group, a first dichroic device, a second dichroic device, an actuation element, and a wavelength conversion device. The excitation light source group includes a plurality of excitation light sources. Each of the excitation light sources is adapted to provide an excitation beam. The first dichroic device is disposed on a transmission path of the excitation beam and is used for configuring the excitation beam to pass therethrough. The second dichroic device and the first dichroic device are disposed crosswise. The second dichroic device has a first area and a second area, and includes a plurality of dichroic elements. The dichroic elements are arranged at a plurality of intervals and located in the first area and the second area. The first dichroic device is located between the first area and the second area. The dichroic elements correspond to the excitation light sources respectively and are used for reflecting the excitation beam. The actuation element is adapted to configure the excitation beam to pass through the second dichroic device in a first period through the intervals between the dichroic elements, and is adapted to configure the excitation beam to be reflected by the dichroic element in a second period. The wavelength conversion device is disposed on a transmission path of the excitation beam passing through the second dichroic device, so as to convert the excitation beam into a conversion beam in the first period, and to reflect the conversion beam to the first dichroic device. The first dichroic device is used for reflecting the conversion beam. The conversion beam, reflected by the first dichroic device, and the excitation beam, reflected by the dichroic element, are transmitted toward a same direction. The illumination beam includes the conversion beam and the excitation beam reflected by the dichroic element.

In order to achieve one or a portion or all of the objectives or other objectives, an illumination system provided by an embodiment of the invention includes an excitation light source group, a first dichroic device, a second dichroic device, an actuation element, and a wavelength conversion device. The excitation light source group includes a plurality of excitation light sources. Each of the excitation light sources is adapted to provide an excitation beam. The first dichroic device is disposed on a transmission path of the excitation beam and is used for configuring the excitation beam to pass therethrough. The second dichroic device and the first dichroic device are disposed crosswise. The second dichroic device has a first area and a second area, and includes a plurality of dichroic elements. The dichroic elements are arranged at a plurality of intervals and located in the first area and the second area. The first dichroic device is located between the first area and the second area. The dichroic elements correspond to the excitation light sources respectively and are used for reflecting the excitation beam. The actuation element is adapted to configure the excitation beam to pass through the second dichroic device in a first period through the intervals between the dichroic elements, and is adapted to configure the excitation beam to be reflected by the dichroic element in a second period. The wavelength conversion device is disposed on a transmission path of the excitation beam passing through the second dichroic device, so as to convert the excitation beam into a conversion beam in the first period, and to reflect the conversion beam to the first dichroic device. The first dichroic device is used for reflecting the conversion beam. The conversion beam, reflected by the first dichroic device, and the excitation beam, reflected by the dichroic element, are transmitted toward a same direction.

The illumination system of the embodiment of the invention has the first dichroic device and the second dichroic device which are disposed crosswise. When in the first period, the actuation element is used for configuring the excitation beam to pass through the intervals between the dichroic elements of the second dichroic device so as to be further converted into the conversion beam by the wavelength conversion device, and then the conversion beam is reflected by the first dichroic device. When in the second period, the actuation element is used for configuring the excitation beam to be reflected by the dichroic element of the second dichroic device. As such, the excitation beam, reflected by the dichroic element of the second dichroic device, and the conversion beam, reflected by the first dichroic device, are transmitted toward the same direction. Compared to known technology, the embodiment of the invention does not need to use a plurality of reflection members to configure the excitation beam, which is not converted by the wavelength conversion device, to additionally wind around a circle of light paths in the illumination system. Therefore, the architecture of the illumination system can be configured to be more compact and thereby has the advantage of smaller volume. Since the projection device of the embodiment of the invention uses the aforementioned illumination system, the volume of the projection device can be reduced.

Other objectives, features and advantages of the invention will be further understood from the further technological features disclosed by the embodiments of the invention wherein there are shown and described preferred embodiments of this invention, simply by way of illustration of modes best suited to carry out the invention.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
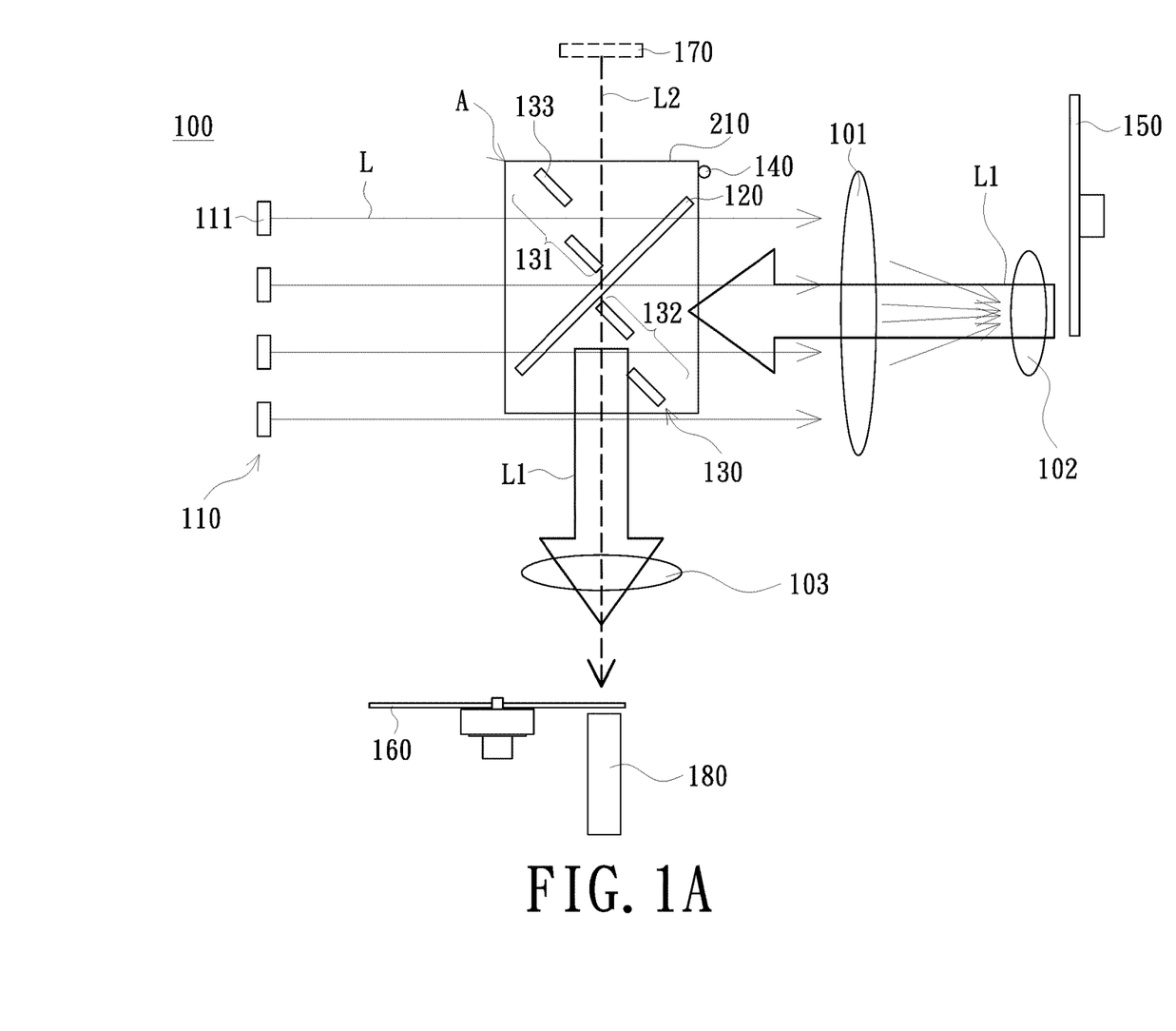
FIG. 1A is a schematic diagram of an illumination system in a first period in accordance with an embodiment of the invention.
Figure 1B:
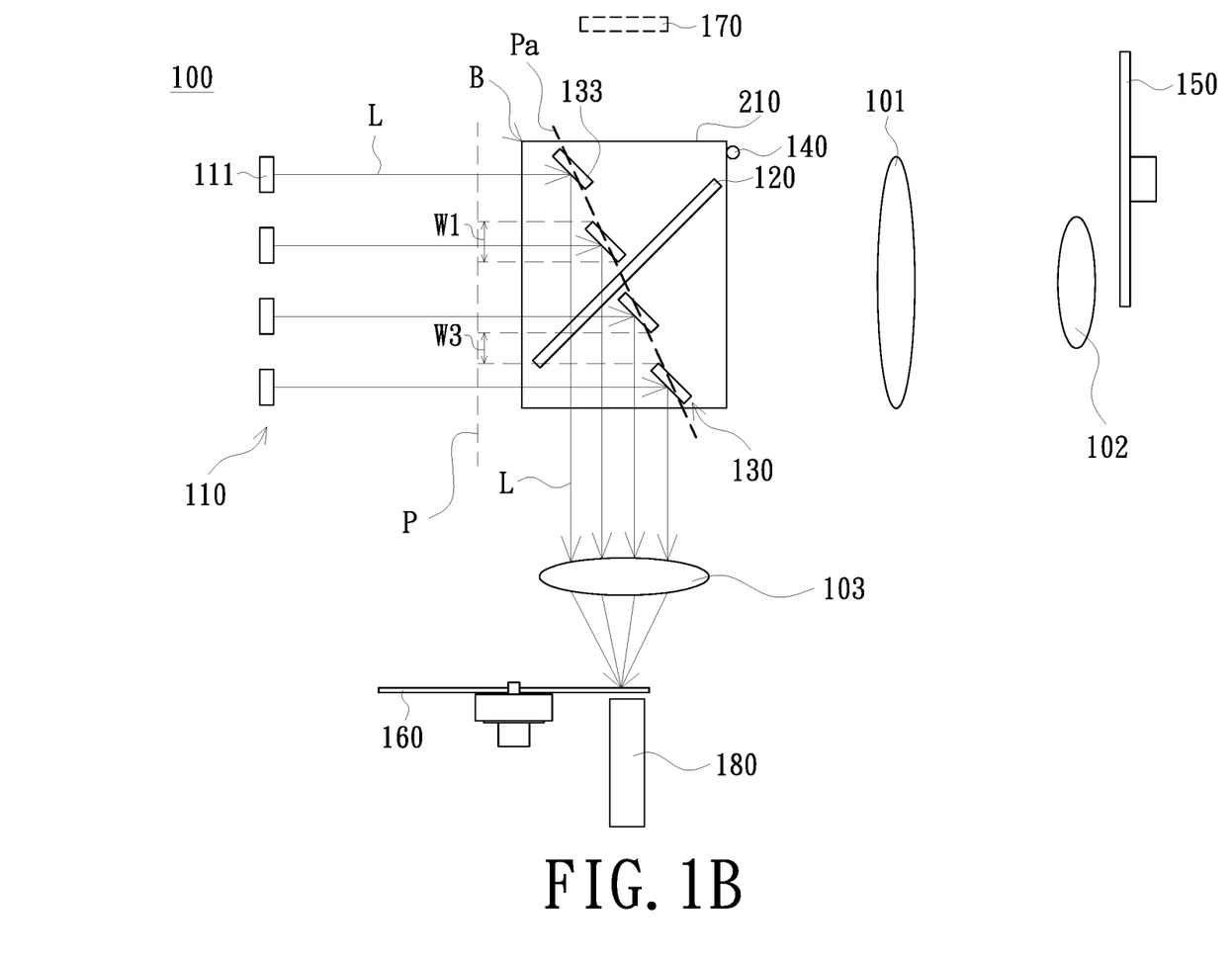
FIG. 1B is a schematic diagram of an illumination system in a second period in accordance with an embodiment of the invention.

FIG. 1A is a schematic diagram of an illumination system in a first period in accordance with an embodiment of the invention. FIG. 1B is a schematic diagram of an illumination system in a second period in accordance with an embodiment of the invention. Please refer to FIG. 1A first. An illumination system 100 of the embodiment includes an excitation light source group 110, a first dichroic device 120, a second dichroic device 130, an actuation element 140, and a wavelength conversion device 150. The excitation light source group 110 includes a plurality of excitation light sources 111. Each of the excitation light sources 111 is used for providing an excitation beam L. The first dichroic device 120 is disposed on a transmission path of the excitation beam L and is used for configuring the excitation beam L to pass therethrough. The second dichroic device 130 and the first dichroic device 120 are disposed crosswise. The second dichroic device 130 has a first area 131 and a second area 132 and includes a plurality of dichroic elements 133. The dichroic elements 133 are arranged at intervals, and located in the first area 131 and the second area 132. The first dichroic device 120 is located between the first area 131 and the second area 132. In the embodiment, there is an interval between two adjacent dichroic elements 133. The dichroic elements 133 correspond to the excitation light sources 111 respectively and are used for reflecting the excitation beam L. As shown in FIG. 1A, the actuation element 140 is used for configuring the excitation beam L to pass through the second dichroic device 130 in the first period through intervals between the dichroic elements 133. As shown in FIG. 1B, the actuation element 140 is used for configuring the excitation beam L to be reflected by the dichroic element 133 in the second period. The wavelength conversion device 150 is disposed on a transmission path of the excitation beam L passing through the second dichroic device 130, so as to convert the excitation beam L into a conversion beam L1 in the first period, and to reflect the conversion beam L1 to the first dichroic device 120. The dichroic element 133 can, for example, allow the conversion beam L1 to pass therethrough. The first dichroic device 120 is used for reflecting the conversion beam L1. As such, the conversion beam L1 (as shown in FIG. 1A), reflected by the first dichroic device 120 in the first period, and the excitation beam L (as shown in FIG. 1B), reflected by the dichroic element 133 of the second dichroic device 130 in the second period, are transmitted toward a same direction.

In the embodiment, the excitation light source 111 is, for example, a laser light source, a light emitting diode, or other solid state light sources, but not limited thereto. The excitation light sources 111 are, for example, arranged in an array.

Please refer to FIG. 1A and FIG. 1B again. The actuation element 140 of the embodiment, for example, drives the second dichroic device 130 to move between a first position A and a second position B. As shown in FIG. 1A, the second dichroic device 130 is located at the first position A in the first period. The excitation beam L passes through the second dichroic device 130 at this time through the intervals between the dichroic elements 133. As shown in FIG. 1B, the second dichroic device 130 is located at the second position B in the second period. At this time, the dichroic elements 133 correspond to the excitation beams L respectively, and each of the dichroic elements 133 is used for reflecting the corresponding excitation beam L.

Figure 2:
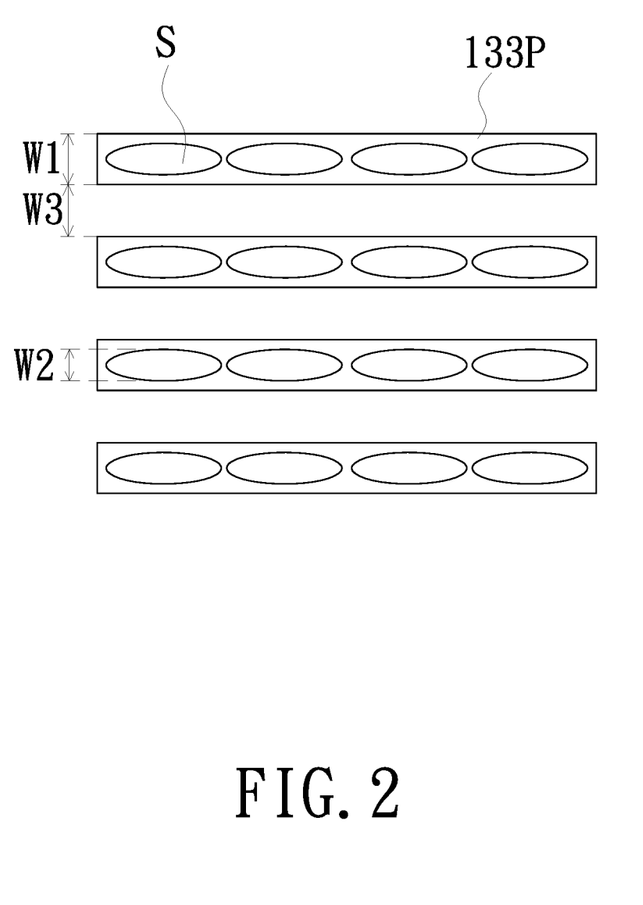
FIG. 2 is a schematic diagram of orthographic projections of dichroic elements of FIG. 1B on a reference plane and light spots of light beams on the reference plane.

FIG. 2 is a schematic diagram of orthographic projections of the dichroic elements of FIG. 1B on a reference plane and light spots of light beams on the reference plane. Please refer to FIG. 1B and FIG. 2. In the embodiment, each of the dichroic elements 133 is, for example, strip-shaped. A quantity of the dichroic elements 133 is four as an example. A center of each of the dichroic elements 133 is, for example, arranged along a predetermined path Pa, wherein the first dichroic device 120 crosses the predetermined path Pa. The dichroic elements 133 are parallel to one another. Each of the dichroic elements 133 crosses the predetermined path Pa respectively. In addition, each of the dichroic elements 133 is, for example, inclined at an angle relative to a reference plane P. The angle of inclination (i.e., an included angle between each of the dichroic elements 133 and the reference plane P) is greater than zero. The reference plane P is located between a light incident side of the second dichroic device 130 and the excitation light source group 110, and is perpendicular to the excitation beam L from the excitation light source group 110. In the embodiment, each of the dichroic elements 133 corresponds to four excitation light sources 111, for example. Therefore, an orthographic projection 133P of each of the dichroic elements 133 in FIG. 2 corresponds to four light spots S.

Please refer to FIG. 1A, FIG. 1B and FIG. 2 again. In the embodiment, a width of an orthographic projection of each of the dichroic elements 133 on the reference plane P is W1. The light spot S of each of the excitation beams L on the reference plane P has a major axis and a minor axis. A width of the minor axis is W2. A spacing between orthographic projections of two adjacent dichroic elements 133 on the reference plane P is W3. A movement distance between the first position A and the second position B is D1. The embodiment, for example, conforms to the following relational formula: $W1 \geq W2$, $W3 > W2$, $D1 \geq W1$. As such, it can be ensured that, when the second dichroic device 130 is at the first position A (as shown in FIG. 1A), the excitation beams L can all pass through the intervals between the dichroic elements 133 without being blocked by the dichroic elements 133, and, it can be ensured that, when the second dichroic device 130 is at the second position B (as shown in FIG. 1B), the excitation beams L can all be reflected by the dichroic elements 133. As shown in FIG. 1A and FIG. 1B, in the embodiment, a path of movement of the second dichroic device 130 between the first position A and the second position B is, for example, a linear path of up-and-down movement, but the invention is not limited thereto.

Figure 3:
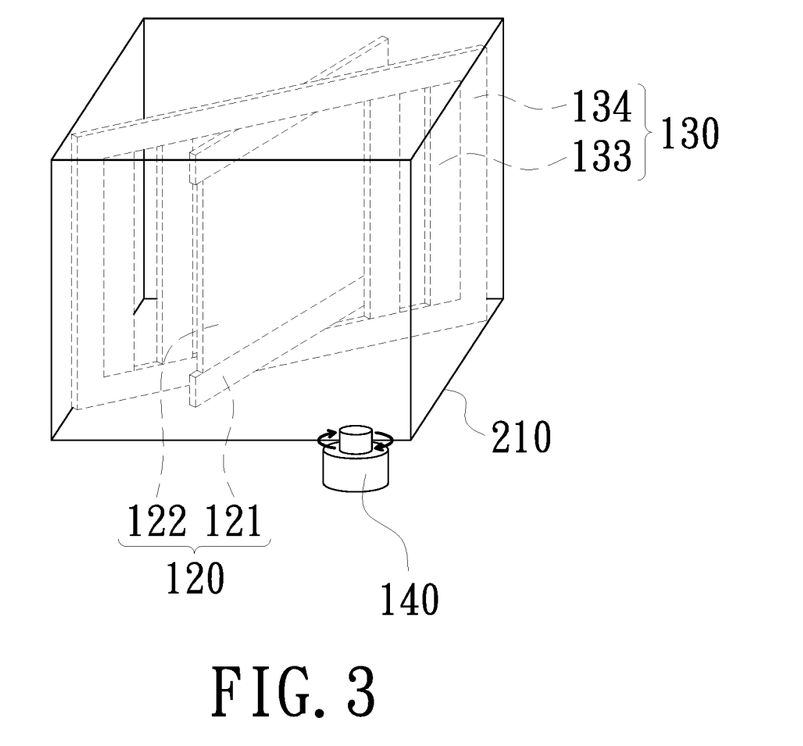
FIG. 3 is a schematic perspective view of an actuation element, a first dichroic device, and a second dichroic device in an embodiment of the invention.
Figure 4:
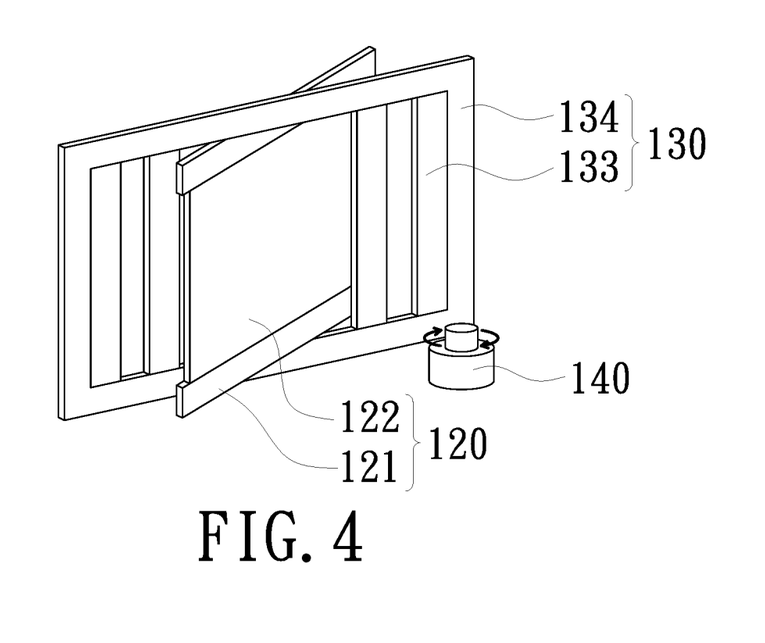
FIG. 4 is a schematic perspective view of an actuation element, a first dichroic device, and a second dichroic device in another embodiment of the invention.

However, in other embodiments, a path of movement of the second dichroic device 130 between the first position A and the second position B may also be a rotational path, as shown in FIG. 3 and FIG. 4. FIG. 3 is a schematic perspective view of an actuation element, a first dichroic device, and a second dichroic device in an embodiment of the invention. Please refer to FIG. 3. In the embodiment, the illumination system 100, for example, further includes a frame body 210, and the first dichroic device 120 and the second dichroic device 130 are fixed in the frame body 210. The first dichroic device 120, for example, includes a side frame 121 and a dichroic sheet 122. The side frame 121 is fixed to the frame body 210, and the dichroic sheet 122 is fixed to the side frame 121. In the embodiment, the second dichroic device 130 further includes an outer frame 134. The outer frame 134 is used for fixing the dichroic element 133, and the outer frame 134 is fixed in the frame body 210. The actuation element 140 is connected to the frame body 210 to drive the frame body 210 to move/rotate, and thereby drives the second dichroic device 130 to move between the first position A (as shown in FIG. 1A) and the second position B (as shown in FIG. 1B). In the embodiment, when the second dichroic device 130 moves/rotates, the first dichroic device 120, for example, moves/rotates accordingly, but the invention is not limited thereto. In other embodiments, the first dichroic device 120 may also not move/rotate as the second dichroic device 130 moves/rotates. However, the invention does not limit a manner of connection between the actuation element and the second dichroic device. Any manner of connection that enables the actuation element to drive the second dichroic device to move/rotate is within the scope of the invention. In another embodiment shown in FIG. 4, the actuation element 140 may also be connected to the outer frame 134 of the second dichroic device 130. The side frame 121 of the first dichroic device 120 is used for connecting to the outer frame 134 and fixing the dichroic sheet 122.

Figure 5:
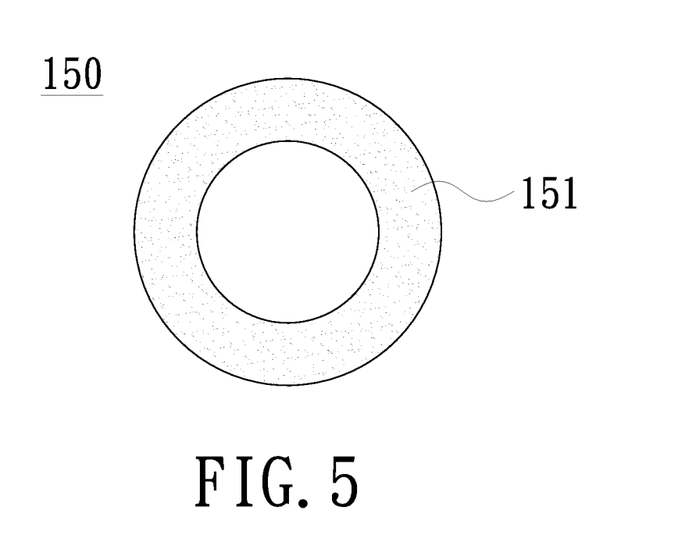
FIG. 5 is a schematic diagram of a wavelength conversion device in accordance with an embodiment of the invention.

FIG. 5 is a schematic diagram of a wavelength conversion device in accordance with an embodiment of the invention. Please refer to FIG. 5. The wavelength conversion device 150 of the embodiment is, for example, a phosphor wheel. However, different from conventional technology, in the embodiment, since the excitation beam L does not irradiate the wavelength conversion device 150 in the second period, the phosphor wheel may have a closed annular wavelength conversion material layer 151. A material of the wavelength conversion material layer 151 is, for example, a phosphor. In an embodiment, the excitation beam L is, for example, a blue light, and the phosphor, for example, converts the blue excitation beam L into a yellow conversion beam L1, but the invention is not limited thereto. In addition, the wavelength conversion material layer 151 may also be divided into a plurality of blocks according to different design demands. The phosphors in the blocks are, for example, of different colors, and can, for example, convert the excitation beam L into a yellow conversion beam L1 and a green conversion beam L1, but the invention is not limited thereto.

In the embodiment, since the excitation beam L does not irradiate the wavelength conversion device 150 in the second period, heat accumulation of the wavelength conversion device 150, can be reduced, thereby increasing a lifespan of the wavelength conversion material layer 151 and lowering a temperature of the wavelength conversion material layer 151. In another embodiment, the excitation beam L does not irradiate the wavelength conversion device 150 in the second period, and thus a section corresponding to the wavelength conversion device 150 may not need to be provided with the wavelength conversion material layer 151, but is only a through-hole or a transparent sheet or a directly exposed bottom plate, but the invention is not limited thereto.

Figure 6:
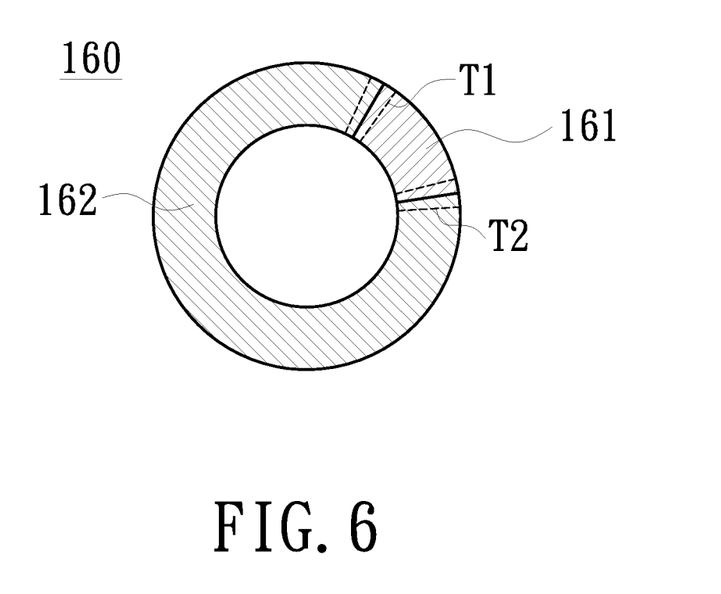
FIG. 6 is a schematic diagram of a color wheel in accordance with an embodiment of the invention.

Please refer to FIG. 1A and FIG. 1B again. The illumination system 100 may further include a color wheel 160, as shown in FIG. 6. Please refer to FIG. 1A, FIG. 1B, and FIG. 6 at the same time. In the embodiment, the color wheel 160 is disposed on transmission paths of the conversion beam L1, reflected by the first dichroic device 120, and the excitation beam L reflected by the dichroic element 133. Please refer to FIG. 6. The color wheel 160 includes an excitation light filter area 161 and a conversion light filter area 162. In an embodiment, the excitation light filter area 161 includes, for example, a blue light filter area, and the conversion light filter area 162 includes, for example, a red light filter area and a green light filter area. In the embodiment, a time for one rotation of the color wheel 160 includes a conversion light filter period, a first spoke time, an excitation light filter period, and a second spoke time, but the invention is not limited thereto. The first period in the embodiment of FIG. 1A corresponds to the conversion light filter period. In the conversion light filter period, the conversion beam L1 can pass through the conversion light filter area 162 (or can be reflected by the conversion light filter area 162) to form a green light and a red light. The second period in the embodiment of FIG. 1B corresponds to the excitation light filter period. In the excitation light filter period, the excitation beam L can pass through the excitation light filter area 161 (or can be reflected by the excitation light filter area 161) to form a blue light, but the invention is not limited thereto. In some embodiments, the excitation light filter area 161 may be replaced by a light penetration area/a light reflection area that does not have a light filter function, but the invention is not limited thereto. In the embodiment, there are junction blocks T1 and T2 between the excitation light filter area 161 and the conversion light filter area 162. The first spoke time and the second spoke time are periods when the light beams irradiate the junction blocks T1 and T2 between the excitation light filter area 161 and the conversion light filter area 162. In the embodiment, the actuation element 140 can drive the second dichroic device 130 to move/rotate (actuate) in the first spoke time and the second spoke time.

The illumination system 100 may further include a plurality of lenses or other optical elements, such as lenses 101, 102, and 103. The lenses 101 and 102 are disposed between the second dichroic device 130 (the dichroic element 133) and the wavelength conversion device 150, and the lenses 101 and 102 are disposed between the first dichroic device 120 and the wavelength conversion device 150. The lens 103 is disposed between the second dichroic device 130 (the dichroic element 133) and the color wheel 160, and the lens 103 is disposed between the first dichroic device 120 and the color wheel 160. In addition, the illumination system 100 may further include a light homogenizing device 180. The light homogenizing device 180 is, for example, a light integration rod, but not limited thereto. The light homogenizing device 180 is, for example, disposed at a side of the color wheel 160 away from the lens 103, that is, the color wheel 160 is located between the light homogenizing device 180 and the lens 103. In another embodiment, the light homogenizing device 180 may also be disposed between the color wheel 160 and the lens 103.

The illumination system 100 of the embodiment can drive the second dichroic device 130 to the first position A and the second position B due to having the actuation element 140. When the second dichroic device 130 is located at the first position A (i.e., in the first period), the excitation beam L passes through the second dichroic device 130. The wavelength conversion device 150 converts the excitation beam L passing through the second dichroic device 130 into the conversion beam L1, and the wavelength conversion device 150 reflects the conversion beam L1 to the first dichroic device 120. The first dichroic device 120 then reflects the conversion beam L1. On the other hand, when the second dichroic device 130 is located at the second position B (i.e., in the second period), the excitation beam L can be directly reflected by the dichroic element 133. Compared to conventional technology, the excitation beam L of the embodiment in the second period can omit a light path of winding one additional circle, and thereby the efficiency can be enhanced, and the illumination system 100 can omit the disposition of many optical elements, thereby allowing the architecture of the illumination system 100 to be configured more compact and to reduce the overall volume.

As shown in FIG. 1A, the illumination system 100 may further optionally include a supplementary light source 170. The supplementary light source 170 is used for providing a supplementary beam L2. The supplementary beam L2 is used for passing through the first dichroic device 120 and the dichroic element 133 of the second dichroic device 130. The supplementary beam L2, the excitation beam L reflected by the dichroic element 133, and the conversion beam L1 reflected by the first dichroic device 120 are transmitted toward a same direction to the color wheel 160. In order to simplify the description, FIG. 1B omits illustration of the supplementary light source 170 and the supplementary beam L2. In addition, the supplementary beam L2 may be a red light, a cyan light or a green light, but the invention is not limited thereto. In an embodiment, the red light and the green light may be provided in the first period, and the cyan light may be provided in the second period, but the invention is not limited thereto.

Figure 7A:
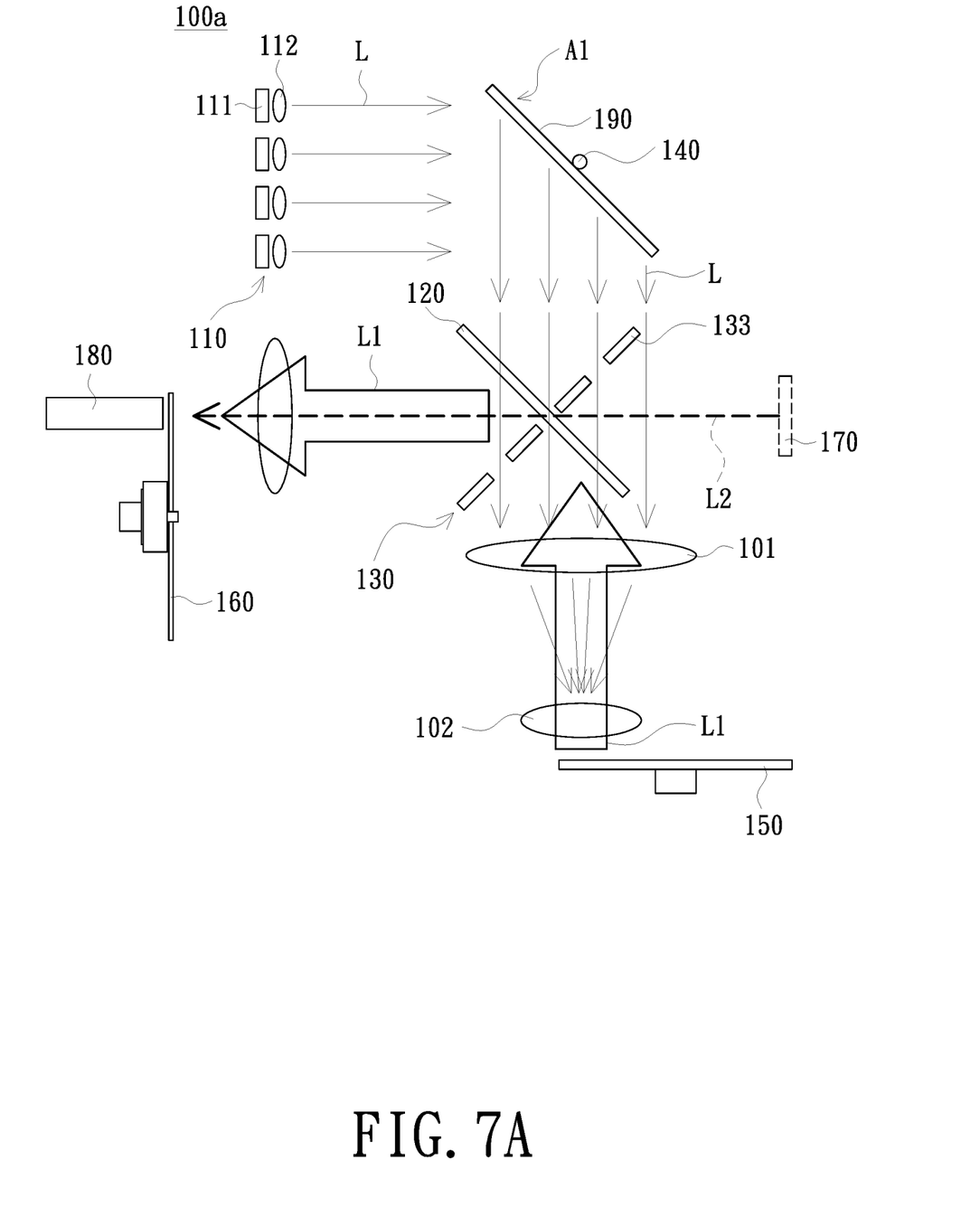
FIG. 7A is a schematic diagram of an illumination system in the first period in accordance with another embodiment of the invention.
Figure 7B:
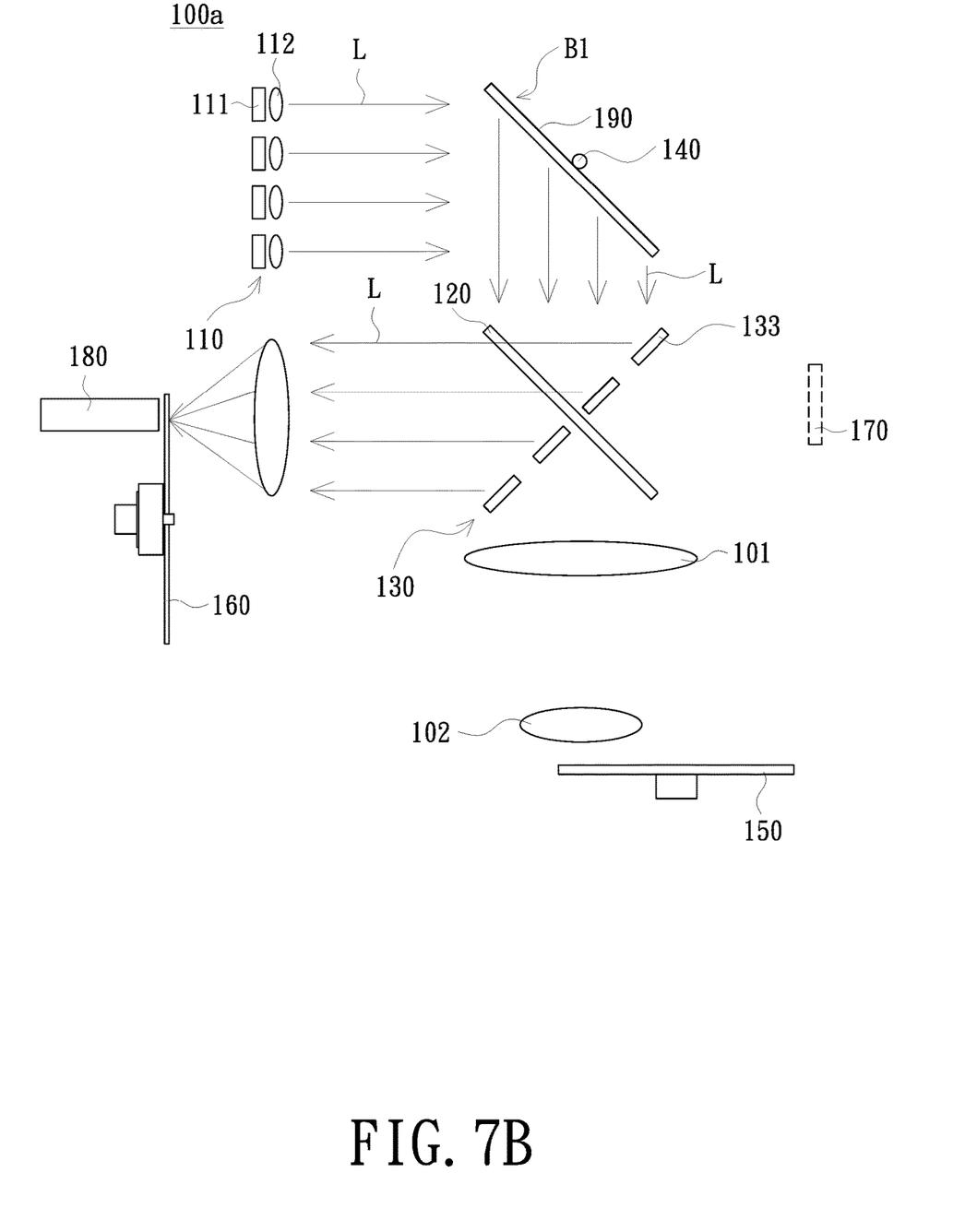
FIG. 7B is a schematic diagram of an illumination system in the second period in accordance with another embodiment of the invention.

FIG. 7A is a schematic diagram of an illumination system in the first period in accordance with another embodiment of the invention. FIG. 7B is a schematic diagram of an illumination system in the second period in accordance with another embodiment of the invention. Please refer to FIG. 7A and FIG. 7B at the same time. Structures and advantages of an illumination system 100a of the embodiment and the illumination system 100 are similar. The following describes only the major differences in their structures. The illumination system 100a of the embodiment further includes a plurality of collimating lenses 112 and a reflection member 190. In the embodiment, the collimating lenses 112 are correspondingly disposed in front of the excitation light sources 111 respectively. The collimating lens 112 is located on a transmission path of the excitation beam L, and the collimating lens 112 is located between the excitation light source 111 and the reflection member 190. The reflection member 190 is disposed between the excitation light source group 110 and the second dichroic device 130. The reflection member 190 is disposed between the excitation light source group 110 and the first dichroic device 120, and the reflection member 190 is used for reflecting the excitation beam L. The reflection member 190 is not particularly limited, and any optical element having a reflection function is within the scope of the invention. The actuation element 140 is connected to the reflection member 190 to drive the reflection member 190 to rotate. Please refer to FIG. 7A. In the first period, the reflection member 190 is located at a first position A1. After the excitation beam L is first reflected by the reflection member 190, the excitation beam L can pass through the second dichroic device 130 through the intervals between the dichroic elements 133 and be transmitted to the wavelength conversion device 150. Then the wavelength conversion device 150 converts the excitation beam L into the conversion beam L1. Since a transmission path of the conversion beam L1 is the same as/similar to that of the above-mentioned embodiment, the description is not repeated herein.

Please refer to FIG. 7B. In the second period, the reflection member 190 is located at a second position B1 to reflect the excitation beam L to the corresponding dichroic element 133. Then the excitation beam L is reflected by the dichroic element 133. Since a transmission path of the excitation beam L, after being reflected by the dichroic element 133, is the same as/similar to that of the above-mentioned embodiment, the description is not repeated herein.

Figure 8A:
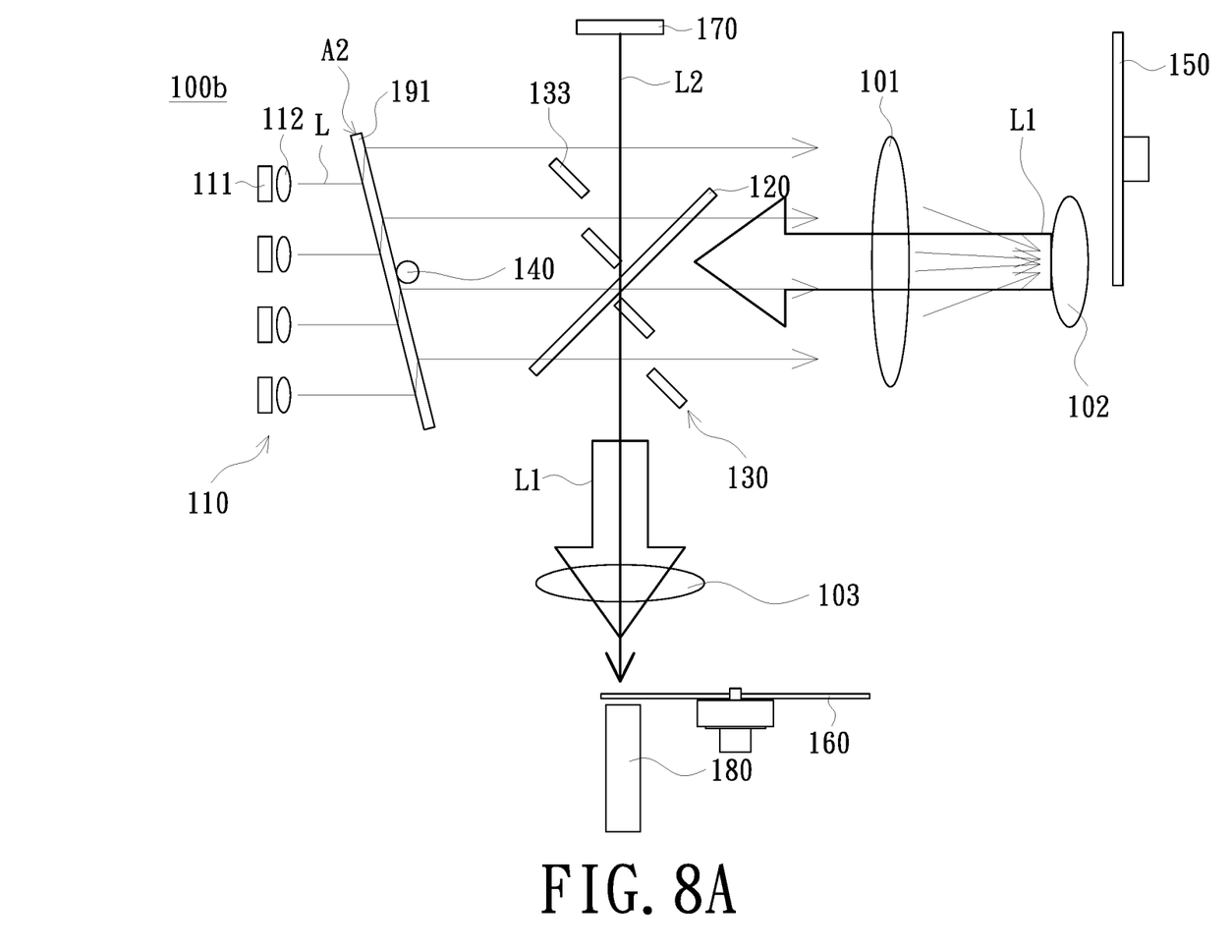
FIG. 8A is a schematic diagram of an illumination system in the first period in accordance with another embodiment of the invention.
Figure 8B:
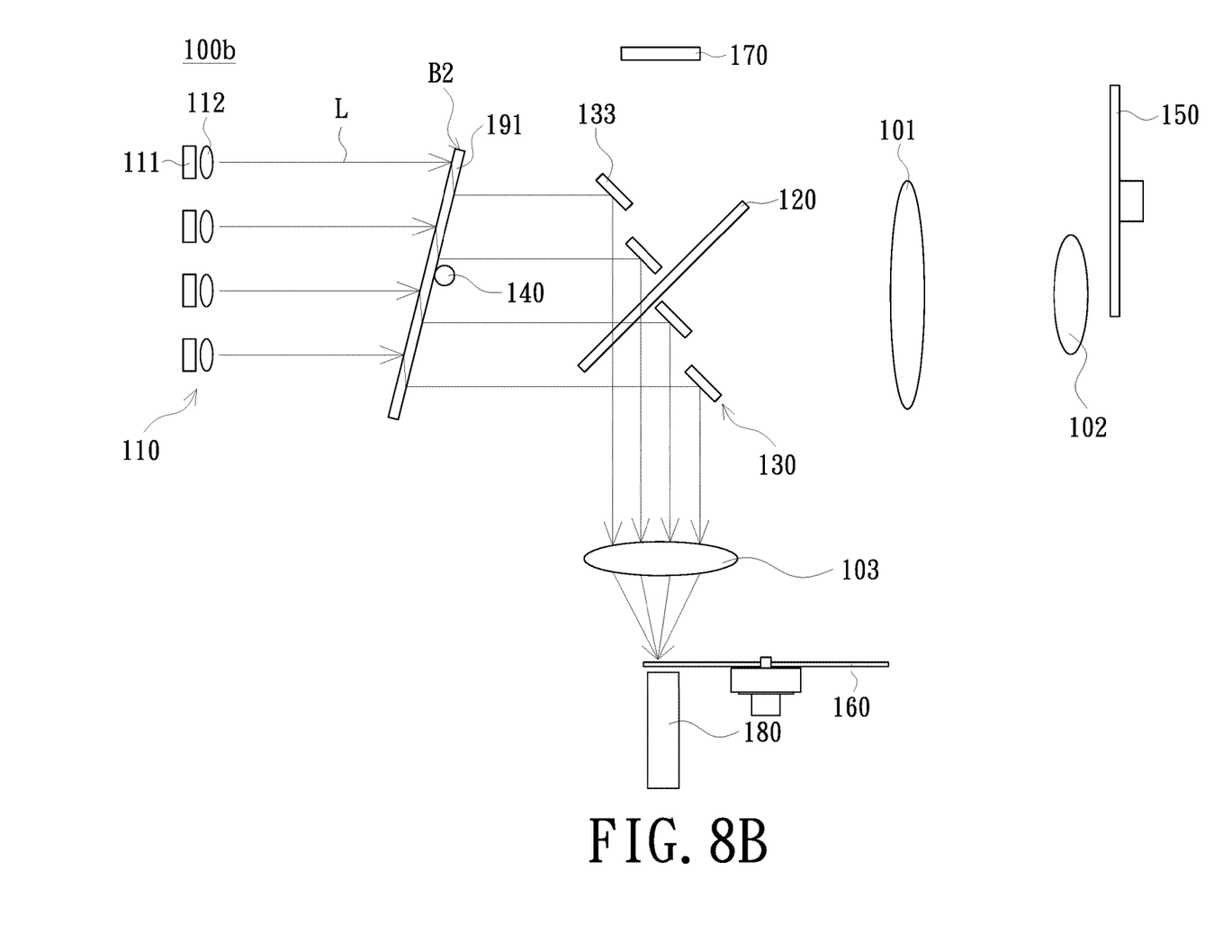
FIG. 8B is a schematic diagram of an illumination system in the second period in accordance with another embodiment of the invention.

FIG. 8A is a schematic diagram of an illumination system in the first period in accordance with another embodiment of the invention. FIG. 8B is a schematic diagram of an illumination system in the second period in accordance with another embodiment of the invention. Please refer to FIG. 8A first. Structures and advantages of an illumination system 100b of the embodiment and the illumination systems 100 and 100a are similar. The following describes only the major differences in their structures. The illumination system 100b of the embodiment further includes a refraction member 191. The refraction member 191 is disposed between the excitation light source group 110 and the second dichroic device 130, and the refraction member 191 is disposed between the excitation light source group 110 and the first dichroic device 120. The refraction member 191 is used for refracting the excitation beam L. The refraction member 191 may be plate glass, or other element that can refract the excitation beam L. The actuation element 140 is connected to the refraction member 191 to drive the refraction member 191 to rotate. Please refer to FIG. 8A. In the first period, the actuation element 140 can drive the refraction member 191 to be located at a first position A2. The excitation beam L, after being first refracted by the refraction member 191, passes through the second dichroic device 130 through the intervals between the dichroic elements 133 and is transmitted to the wavelength conversion device 150. Then the wavelength conversion device 150 converts the excitation beam L into the conversion beam L1. Since a transmission path of the conversion beam L1 is the same as/similar to that of the above-mentioned embodiment, the description is not repeated herein.

Please refer to FIG. 8B. In the second period, the actuation element 140 can drive the refraction member 191 to be located at a second position B2. The refraction member 191 refracts the excitation beam L to the corresponding dichroic element 133. Then the excitation beam L is reflected by the dichroic element 133. Since a transmission path of the excitation beam L, after being reflected by the dichroic element 133, is the same as/similar to that of the above-mentioned embodiment, the description is not repeated herein.

However, in other embodiments, the refraction member 191 in FIG. 8A and FIG. 8B may also be replaced by a third dichroic device. The actuation element 140 can drive the third dichroic device to move/rotate to the first position A2 and the second position B2. The relationship between the third dichroic device and a light transmission path can be implemented by any architecture known to those of ordinary skill in the art, and is not limited in the invention.

Figure 9:
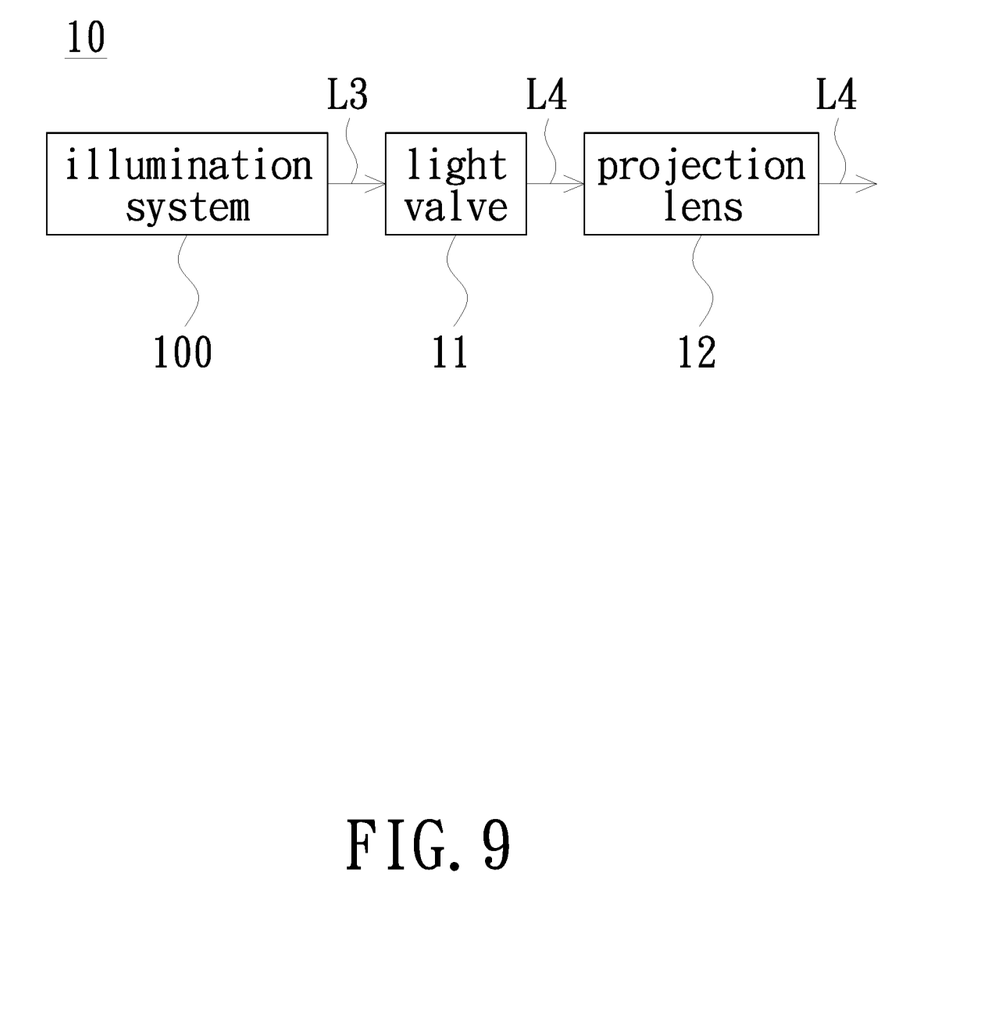
FIG. 9 is a schematic block diagram of a projection device in accordance with an embodiment of the invention.

FIG. 9 is a schematic block diagram of a projection device in accordance with an embodiment of the invention. Please refer to FIG. 1A, FIG. 1B, and FIG. 9. A projection device 10 of the embodiment includes the illumination system 100, a light valve 11, and a projection lens 12. The illumination system 100 is used for providing an illumination beam L3. The light valve 11 is disposed on a transmission path of the illumination beam L3 to convert the illumination beam L3 into an image beam L4. The projection lens 12 is disposed on a transmission path of the image beam L4, and is used for configuring the image beam L4 to pass therethrough and to be projected to a screen (not shown in the figure), so as to form image pictures on the screen. In an embodiment, the light valve 11 may be a digital micro-mirror device (DMD), a liquid-crystal display (LCD), a liquid crystal on silicon panel (LCoS panel), a transparent liquid crystal panel, an electro-optical modulator, a magneto-optic modulator, or an acousto-optic modulator (AOM), but the invention is not limited thereto. In the embodiment, the illumination beam L3 includes the conversion beam L1 and the excitation beam L reflected by the dichroic element 133 of the second dichroic device 130. In an embodiment in which the illumination system 100 includes the supplementary light source 170, the illumination beam L3 further includes the supplementary beam L2. In an embodiment, after the illumination beam L3 passes through the color wheel 160, a red light, a green light, and a blue light (the order is not limited thereto) can be generated according to the order of time, but the invention is not limited thereto. Based on the above, it can be seen that, since the volume of the illumination system 100 is smaller, the projection device 10 has the advantage of smaller volume. In other embodiments, the projection device 10 may also use the illumination system 100a or 100b of other aforementioned embodiments.

In summary, the illumination system of the embodiment of the invention has the first dichroic device and the second dichroic device which are disposed crosswise. When in the first period, the actuation element is used for configuring the excitation beam to pass through the intervals between the dichroic elements of the second dichroic device so as to be further converted into the conversion beam by the wavelength conversion device, and then the conversion beam is reflected by the first dichroic device. When in the second period, the actuation element is used for configuring the excitation beam to be reflected by the dichroic element of the second dichroic device. As such, the excitation beam, reflected by the dichroic element of the second dichroic device, and the conversion beam, reflected by the first dichroic device, are transmitted toward the same direction. Compared to known technology, the embodiment of the invention does not need to use a plurality of reflection members to configure the excitation beam, which is not converted by the wavelength conversion device, to additionally wind around a circle of light paths in the illumination system. Therefore, the architecture of the illumination system can be configured to be more compact and thereby has the advantage of smaller volume. Since the projection device of the embodiment of the invention uses the aforementioned illumination system, the volume of the projection device can be reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first spoke time, the second spoke time, the first period, the second period, the first dichroic device, the second dichroic device, the third dichroic device, the first area, the second area, the first position, and the second position are only used for distinguishing various elements and do not limit the number of the elements.

What is claimed is:

1. A projection device, comprising:
   an illumination system, adapted to provide an illumination beam, wherein the illumination system comprises:
      an excitation light source group comprising a plurality of excitation light sources, wherein each of the excitation light sources is adapted to provide an excitation beam;
      a first dichroic device disposed on a transmission path of the excitation beam and used for configuring the excitation beam to pass therethrough;
      a second dichroic device having a first area and a second area, and wherein the second dichroic device and the first dichroic device are disposed crosswise, the second dichroic device comprises a plurality of dichroic elements, the dichroic elements are arranged at a plurality of intervals and are located in the first area and the second area, the first dichroic device is located between the first area and the second area, and the dichroic elements correspond to the excitation light sources respectively and are used for reflecting the excitation beam;
      an actuation element adapted to configure the excitation beam to pass through the second dichroic device in a first period through the intervals between the dichroic elements, and adapted to configure the excitation beam to be reflected by the dichroic elements in a second period; and
      a wavelength conversion device disposed on a transmission path of the excitation beam passing through the second dichroic device, so as to convert the excitation beam into a conversion beam in the first period, and reflect the conversion beam to the first dichroic device, wherein the first dichroic device is used for reflecting the conversion beam, the conversion beam reflected by the first dichroic device and the excitation beam reflected by the dichroic elements are transmitted toward the same direction, and the illumination beam comprises the conversion beam and the excitation beam reflected by the dichroic elements;
   a light valve, disposed on a transmission path of the illumination beam, and adapted to convert the illumination beam into an image beam; and
   a projection lens, disposed on a transmission path of the image beam, and used for configuring the image beam to pass therethrough.

2. The projection device according to claim 1, wherein the actuation element is adapted to drive the second dichroic device to move between a first position and a second position, the second dichroic device is located at the first position in the first period, and the second dichroic device is located at the second position in the second period.

3. The projection device according to claim 2, wherein the dichroic elements are respectively inclined at an angle relative to a reference plane, the reference plane is located between the second dichroic device and the excitation light source group and is perpendicular to the excitation beam from the excitation light source group, a width of an orthographic projection of each of the dichroic elements on the reference plane is W1, a light spot of each of the excitation beams on the reference plane has a major axis and a minor axis, a width of the minor axis is W2, a spacing between orthographic projections of two adjacent dichroic elements on the reference plane is W3, a movement distance between the first position and the second position is D1, and W1≥W2, W3>W2, D1≥W1.

4. The projection device according to claim 1, wherein the dichroic elements are respectively inclined at an angle relative to a reference plane, the reference plane is located between the second dichroic device and the excitation light source group and is perpendicular to the excitation beam from the excitation light source group, a width of an orthographic projection of each of the dichroic elements on the reference plane is W1, a light spot of each of the excitation beams on the reference plane has a major axis and a minor axis, a width of the minor axis is W2, a spacing between orthographic projections of two adjacent dichroic elements on the reference plane is W3, and W1≥W2, W3>W2.

5. The projection device according to claim 1, wherein the illumination system further comprises a reflection member, the reflection member is disposed between the excitation light source group and the first dichroic device, the reflection member is disposed between the excitation light source group and the second dichroic device, the reflection member is used for reflecting the excitation beam, the actuation element is used for driving the reflection member to rotate between a first position and a second position, the reflection member is located at the first position in the first period, and the reflection member is located at the second position in the second period.

6. The projection device according to claim 1, wherein the illumination system further comprises a refraction member, the refraction member is disposed between the excitation light source group and the first dichroic device, the refraction member is disposed between the excitation light source group and the second dichroic device, the refraction member is used for refracting the excitation beam, the actuation element is adapted to drive the refraction member to rotate between a first position and a second position, the refraction member is located at the first position in the first period, and the refraction member is located at the second position in the second period.

7. The projection device according to claim 1, wherein the illumination system further comprises a color wheel, the color wheel is disposed on transmission paths of the conversion beam reflected by the first dichroic device and the excitation beam reflected by the dichroic elements, the color wheel comprises an excitation light filter area and a conversion light filter area, a time for one rotation of the color wheel comprises a conversion light filter period, a first spoke time, an excitation light filter period and a second spoke time, the first period corresponds to the conversion light filter period, the conversion beam passes through the conversion light filter area, the second period corresponds to the excitation light filter period, the excitation beam passes through the excitation light filter area, and the actuation element actuates at the first spoke time and the second spoke time.

8. The projection device according to claim 1, wherein the illumination system further comprises a supplementary light source, the supplementary light source is used for providing a supplementary beam, the first dichroic device and the dichroic elements are used for configuring the supplementary beam to pass therethrough, the supplementary beam, the conversion beam reflected by the first dichroic device, and the excitation beam reflected by the dichroic elements are transmitted toward a same direction, and the illumination beam further comprises the supplementary beam.

9. An illumination system, comprising:
an excitation light source group, comprising a plurality of excitation light sources, wherein each of the excitation light sources is adapted to provide an excitation beam;
a first dichroic device, disposed on a transmission path of the excitation beam and used for configuring the excitation beam to pass therethrough;
a second dichroic device, wherein the second dichroic device and the first dichroic device are disposed crosswise, the second dichroic device has a first area and a second area and comprises a plurality of dichroic elements, the dichroic elements are arranged at a plurality of intervals and are located in the first area and the second area, the first dichroic device is located between the first area and the second area, and the dichroic elements correspond to the excitation light sources respectively and are used for reflecting the excitation beam;
an actuation element, adapted to configure the excitation beam to pass through the second dichroic device in a first period through the intervals between the dichroic elements, and adapted to configure the excitation beam to be reflected by the dichroic elements in a second period; and
a wavelength conversion device, disposed on a transmission path of the excitation beam passing through the second dichroic device, so as to convert the excitation beam into a conversion beam in the first period, and to reflect the conversion beam to the first dichroic device, wherein the first dichroic device is used for reflecting the conversion beam, and the conversion beam reflected by the first dichroic device and the excitation beam reflected by the dichroic elements are transmitted toward a same direction.

10. The illumination system according to claim 9, wherein the actuation element is adapted to drive the second dichroic device to move between a first position and a second position, the second dichroic device is located at the first position in the first period, and the second dichroic device is located at the second position in the second period.

11. The illumination system according to claim 10, wherein the dichroic elements are respectively inclined at an angle relative to a reference plane, the reference plane is located between the second dichroic device and the excitation light source group and is perpendicular to the excitation beam from the excitation light source group, a width of an orthographic projection of each of the dichroic elements on the reference plane is W1, a light spot of each of the excitation beams on the reference plane has a major axis and a minor axis, a width of the minor axis is W2, a spacing between orthographic projections of two adjacent dichroic elements on the reference plane is W3, a movement distance between the first position and the second position is D1, and W1≥W2, W3>W2, D1≥W1.

12. The illumination system according to claim 9, wherein the dichroic elements are respectively inclined at an angle relative to a reference plane, the reference plane is located between the second dichroic device and the excitation light source group and is perpendicular to the excitation beam from the excitation light source group, a width of an orthographic projection of each of the dichroic elements on the reference plane is W1, a light spot of each of the excitation beams on the reference plane has a major axis and a minor axis, a width of the minor axis is W2, a spacing between orthographic projections of two adjacent dichroic elements on the reference plane is W3, and W1≥W2, W3>W2.

13. The illumination system according to claim 9, further comprising a reflection member, wherein the reflection member is disposed between the excitation light source group and the first dichroic device, the reflection member is disposed between the excitation light source group and the second dichroic device, the reflection member is used for reflecting the excitation beam, the actuation element is used for driving the reflection member to rotate between a first position and a second position, the reflection member is located at the first position in the first period, and the reflection member is located at the second position in the second period.

14. The illumination system according to claim 9, further comprising a refraction member, wherein the refraction member is disposed between the excitation light source group and the first dichroic device, the refraction member is disposed between the excitation light source group and the second dichroic device, the refraction member is used for refracting the excitation beam, the actuation element is adapted to drive the refraction member to rotate between a first position and a second position, the refraction member is located at the first position in the first period, and the refraction member is located at the second position in the second period.

15. The illumination system according to claim 9, further comprising a color wheel, wherein the color wheel is disposed on transmission paths of the conversion beam reflected by the first dichroic device and the excitation beam reflected by the dichroic elements, the color wheel comprises an excitation light filter area and a conversion light filter area, a time for one rotation of the color wheel comprises a conversion light filter period, a first spoke time, an excitation light filter period and a second spoke time, the first period corresponds to the conversion light filter period, the conversion beam passes through the conversion light filter area, the second period corresponds to the excitation light filter period, the excitation beam passes through the excitation light filter area, and the actuation element actuates at the first spoke time and the second spoke time.

16. The illumination system according to claim 9, further comprising a supplementary light source, wherein the supplementary light source is used for providing a supplementary beam, the first dichroic device and the dichroic elements are used for configuring the supplementary beam to pass therethrough, and the supplementary beam, the conversion beam reflected by the first dichroic device, and the excitation beam reflected by the dichroic elements are transmitted toward a same direction.

* * * * *